United States Patent [19]

Kuze

[11] Patent Number: 5,083,705
[45] Date of Patent: Jan. 28, 1992

[54] WAX-PELLET THERMOSTAT

[76] Inventor: Yoshikazu Kuze, 31-3, Higashimagome 1-chome, Ohta-ku, Tokyo, Japan

[21] Appl. No.: 660,237

[22] Filed: Feb. 25, 1991

Related U.S. Application Data

[63] Continuation of Ser. No. 477,412, Feb. 9, 1990, abandoned.

[30] Foreign Application Priority Data

Feb. 15, 1989 [JP] Japan .................................. 1-33696

[51] Int. Cl.⁵ ............................................... F01P 7/16
[52] U.S. Cl. ..................................... 236/34.5; 251/175
[58] Field of Search ................... 236/34, 34.5; 251/175

[56] References Cited

U.S. PATENT DOCUMENTS

| | | | |
|---|---|---|---|
| 3,027,134 | 3/1962 | Nichols | 251/175 |
| 3,095,008 | 6/1963 | Rudelick | 251/175 X |
| 3,409,269 | 11/1968 | Fawkes | 251/175 |
| 3,990,676 | 11/1976 | Brownstein | 251/175 |
| 4,172,585 | 10/1979 | Rolfe | 251/175 X |
| 4,883,225 | 11/1989 | Kitchens | 236/34.5 |

*Primary Examiner*—William E. Tapolcai

[57] ABSTRACT

A wax-pellet thermostat having a frame having a valve seat, a piston secured to the frame, a guide member slidably mounted on the piston, and a valve secured to the guide member. A resilient annular seal member is secured to an outer periphery portion of the primary valve. An annular groove is formed in the seal member to form an annular resilient lip at an outer periphery of the seal member. The resilient lip is arranged to be engaged with an inside wall of the frame by pressure of coolant in a main passage of a cooling system.

2 Claims, 5 Drawing Sheets

WAX-PELLET THERMOSTAT

This application is a continuation of application Ser. No. 07/477,412, filed on Feb. 9, 1990, now abandoned.

BACKGROUND OF THE INVENTION

The present invention relates to a wax-pellet thermostat for an engine cooling system for an automobile.

FIG. 4 shows a conventional cooling system in an automotive engine having a thermostat 1. The thermostat 1 comprises a thermo actuator 38, a primary valve 5 and a secondary valve 17. The thermostat 1 is disposed in a coolant discharge passage between an upper outlet 26 of water jackets 24 of an engine and an upper inlet 31 of a radiator 30. Namely, an upper outlet 26 of the water jackets 24 is communicated with the upper inlet 31 of the radiator 30 through a thermostat housing 27, a cap 28 and a passage 29. An outlet of a water pump 25 is connected to a lower inlet of the water jackets 24. A lower outlet 32 of the radiator 30 is connected to an inlet 33 of the water pump 25 through a passage 34. A bypass passage 36 is provided between a valve opening of the secondary valve 17 and a junction 35 of the passage 34.

During engine warmup at the initial stage, since the engine is cold, the primary valve 5 of the thermostat 1 in the thermostat housing 27 is closed to cut off the flow of coolant through the radiator 30. Coolant is circulated by the water pump 25 passing through the water jackets 24, thermostat housing 27, and bypass passage 36, as indicated by arrows, so that the temperature of the coolant rapidly rises.

When the engine reaches its normal operating temperature, and the temperature of the coolant reaches a predetermined valve-opening temperature of the thermostat 1, the primary valve 5 of the thermostat opens. Thus, a part of coolant flows from the thermostat housing 27 into the radiator 30 through the passage 29 and flows from top to bottom in the radiator 30, and drawn into the water jackets 24 through the passage 34 by the water pump 25 together with the coolant from the bypass passage 36.

In practice, however, the heat sensitivity of the thermo-actuator 38 of thermostat 1 is low, so that the temperature rising rate of the thermostat is slow compared with the temperature rising rate of the coolant. Under certain conditions, the thermostat 1 does not open at the predetermined valve-opening temperature. For example, the thermostat 1 opens When the temperature of the coolant reaches a higher temperature by 15° C., or 25° C. in an extreme case, than the predetermined temperature. In such a case, since the thermostat 1 suddenly opens and the low temperature coolant flows from the radiator 30 into the water jackets 24 through the water pump 25, the temperature of coolant in the water jackets 24 is rapidly lowered by the coolant from the the radiator 30 which causes the thermostat to close again.

If the peak of the heat overshoot occurring in the initial opening period of thermostat and the surge of pressure occurring at the closing of the thermostat simultaneously occur and repeat, cracks of the water jackets and cylinder head, breakdowns of the thermostat and radiator, and other problems will occur. This will cause serious engine troubles.

In order to reduce the heat overshoot and the surge pressure at the initial state of the engine warmup, another engine cooling system shown in FIG. 5 is mainly employed in automobiles at present. In the cooling system, the thermostat 1 is provided in the inlet side passage of the water jackets. In the closing state of the thermostat 1 at an initial stage, the coolant circulates passing through the water jacket 24, the bypass passage 36.

In the closed state of the primary valve 5 of the thermostat 1, the pressure of the coolant from the radiator 30 is applied to the primary valve 5 of the thermostat 1 to urge it to open. In the conventional cooling system, the coolant leaks about 0.2 liter per minute under the pressure of the coolant of 0.8 kg/cm$^2$, passing through the primary valve 5. Consequently, the thermostat 1 is cooled by the low temperature coolant, so that the thermostat does not open at the predetermined temperature. As a result, the engine is not properly cooled, thereby reducing the thermal efficiency of the engine and occurring the heat overshoot and the surge pressure.

SUMMARY OF THE INVENTION

The object of the present invention is to provide a wax-pellet thermostat in which a primary valve having a main sealing mechanism and a sub-sealing mechanism is securely closed in a closed state, thereby preventing the leakage of the coolant.

According to the present invention, there is provided a wax-pellet thermostat having a thermostat housing having a first passage forming a part of a main passage and a second passage forming a part of a bypass passage, a thermostat frame secured to the thermostat housing, a valve seat formed on the thermostat frame, a piston secured to the frame, a guide member slidably mounted around the piston, a primary valve secured to the guide member for moving into and out of the valve seat, a coil spring for biasing the primary valve against said valve seat so as to close the first passage, a heat conductive cylinder secured to the guide member, a secondary valve provided on the heat conductive cylinder so as to close the second passage.

The thermostat comprises a resilient annular seal member secured to an outer periphery portion of the primary valve and having an annular groove forming an annular resilient lip at an outer periphery of the seal member, an outer periphery of the resilient lip being arranged to be engaged with an inside wall of the frame by pressure of coolant in the first passage applied to the wall of the annular groove.

These and other objects and features of the present invention will become more apparent from the following description with reference to the accompanying drawings.

DETAILED DESCRIPTION OF THE PREFERRED EMBODIMENT

Figure 1:
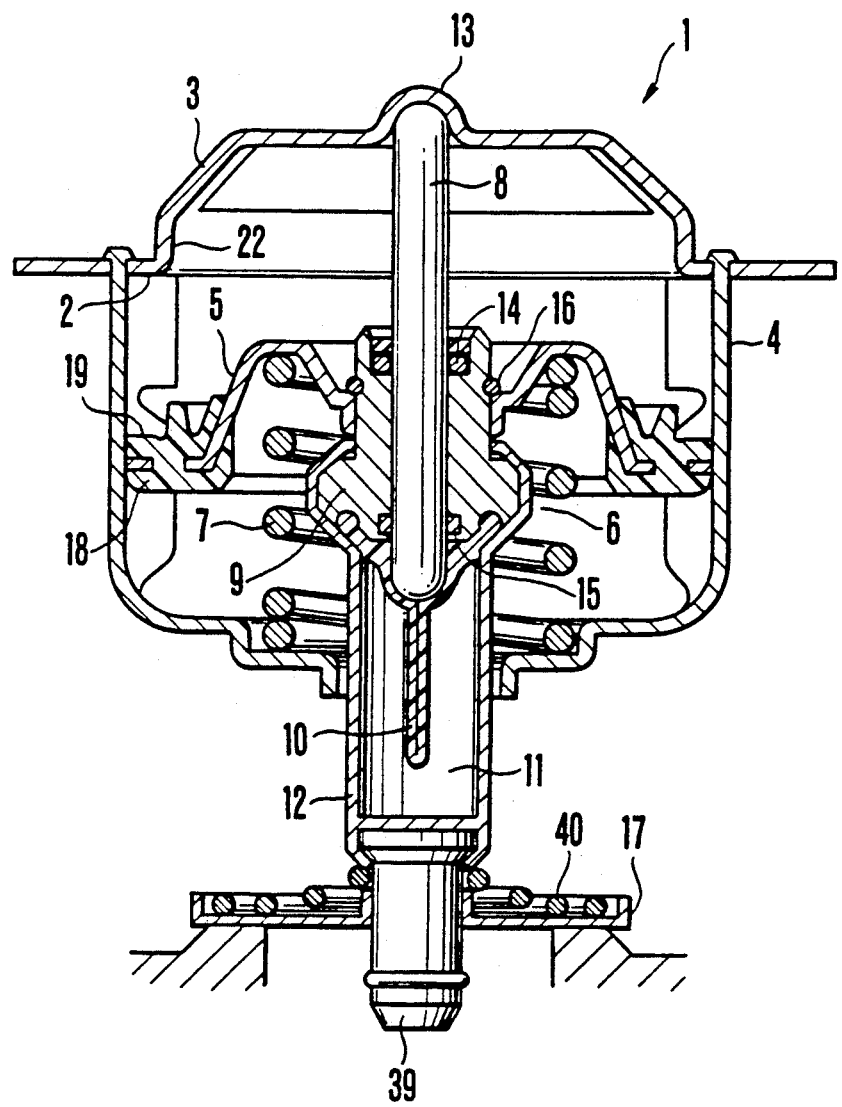
FIG. 1 is a sectional view of a wax-pellet thermostat according to the present invention in a fully opened state.
Figure 2:
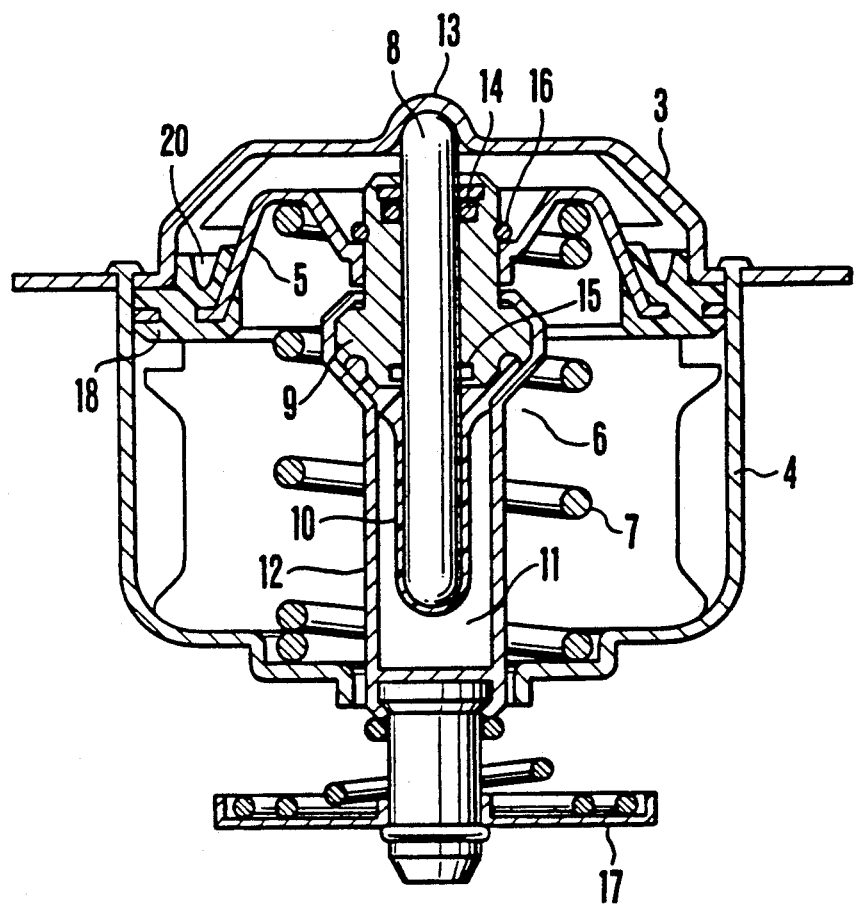
FIG. 2 is a sectional view of the thermostat in closed state.

Referring to FIGS. 1 and 2, the wax-pellet thermostat 1 of the present invention has a thermostat frame comprising a first frame 3 and a second frame 4 secured to the first frame 3. The first frame 3 has a valve seat 2. A thermo-actuator 6 comprises a steel rod 8 secured to the first frame 3 at a top portion 13, a guide member 9 slidably engaged with the rod 8, the primary valve 5 secured to the guide member 9, a heat conductive cylinder 12 secured to the guide member 9, a resilient seal spool 10 secured to the guide member 9, and wax pellets 11 provided in the cylinder 12. An O-ring 14 and a seal packing 15 are provided in the guide member 9 to be slidably engaged with the steel rod 8. A return coil spring 7 disposed surrounding the cylinder 12 is provided between the primary valve 5 and the bottom of the second frame 4. A snap ring 16 is engaged with the guide member 9 for securing the primary valve 5 to the guide member 9. The secondary valve 17 is slidably mounted on a shaft 39 secured to the bottom of the cylinder 12 and resiliently held on the shaft 39 by a spiral spring 40. A resilient annular seal member 18 is secured to the outer periphery of the primary valve 5.

Figure 3:
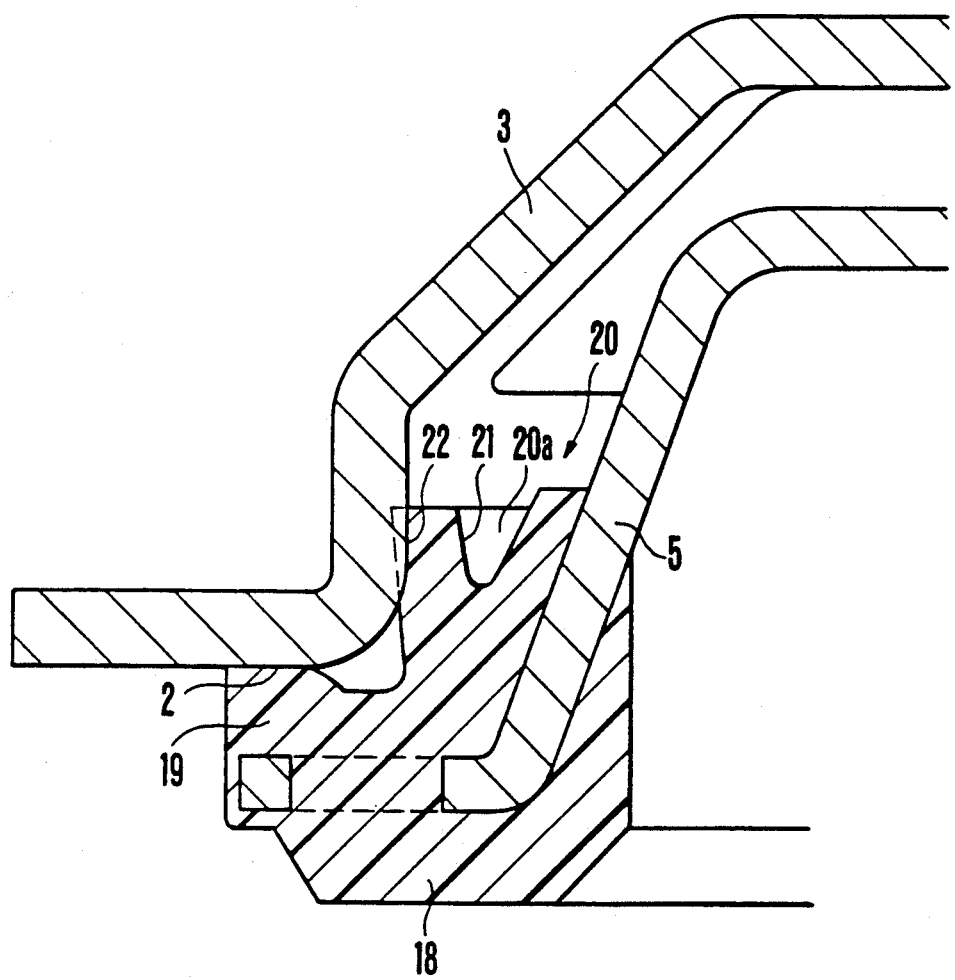
FIG. 3 is an enlarged sectional view of a sealing mechanism for a valve.
Figure 4:
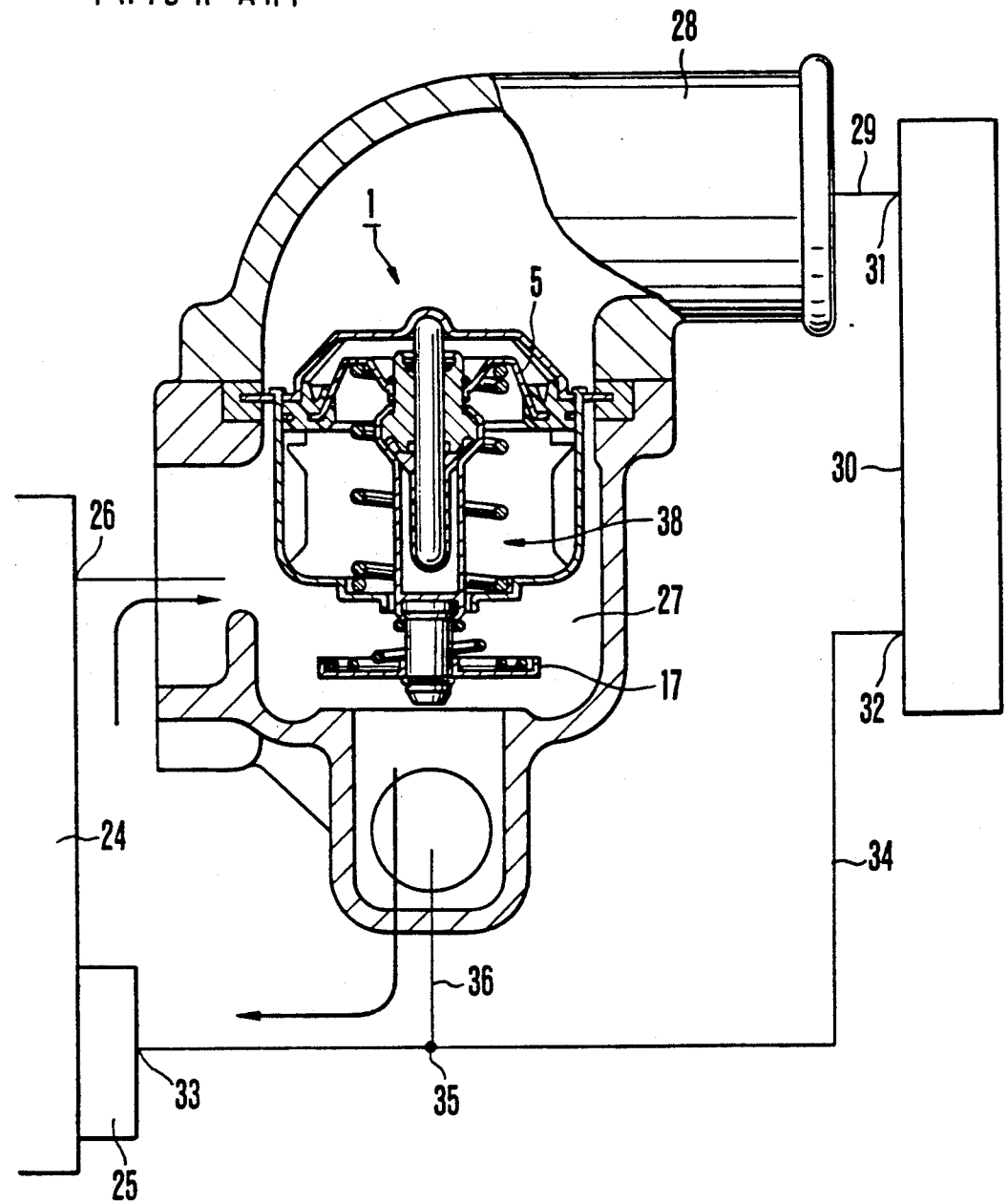
FIG. 4 is a schematic diagram showing a conventional engine cooling system.

Referring to FIG. 3, the resilient seal member 18 is secured to the outer periphery of the primary valve 5 by molding. The seal member 18 has an outer flange portion 19 which is resiliently engaged with the valve seat 2 of the frame 3 by the spring 7 so as to act as a main sealing mechanism for the valve 5. An annular seal packing portion 20 has an annular groove 20a to form a v-shaped section as a sub-sealing mechanism. The seal packing portion 20 is provided with an outer movable resilient lip 21 at a portion inside the flange portion 19 so as to be abutted on an inside wall 22 of the frame 3.

FIG. 2 shows the valve in the closed state. When the temperature of the coolant rises in excess of a predetermined value of the thermostat, the wax pellets 11 expand. This forces the spool seal 10 against the steel rod 8. As the wax pellets 11 squeeze the seal spool 10 around the rod 8, the wax pellets 11 overcome the coil spring 7 and the thermo-actuator 6 moves downward, thereby opening the primary valve 5 as shown in FIG. 1.

When the thermostat 1 cools, the wax pellets 11 contract. Then, the coil spring 7 returns the valve 5 to the closed position as shown in FIG. 2.

Figure 5:
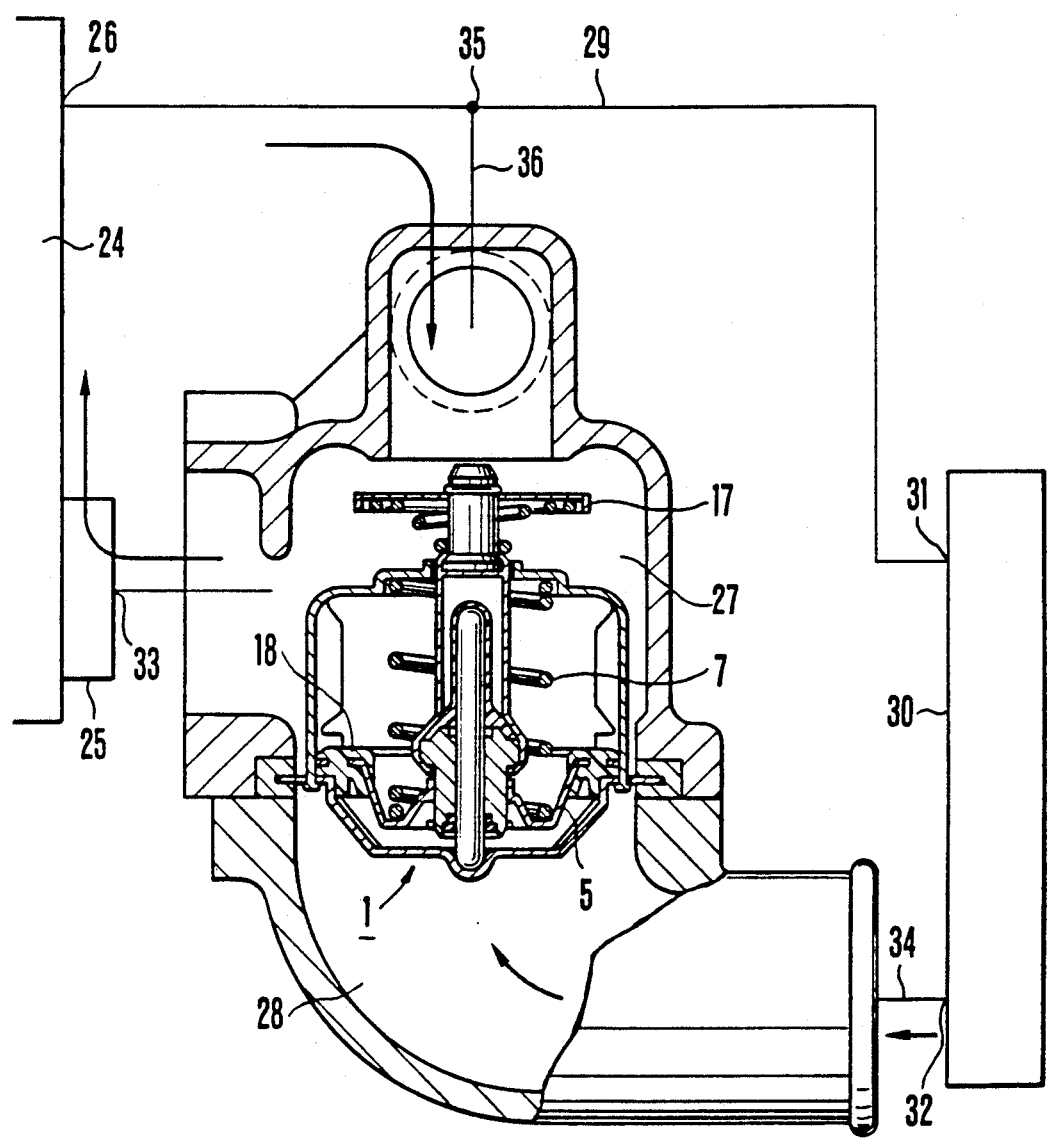
FIG. 5 is a schematic diagram showing an engine cooling system provided with the thermostat according to the present invention.

Referring to FIG. 5 showing the engine cooling system provided with the thermostat 1 of the present invention, the thermostat housing 27 is disposed in the inlet side passage comprising the passage 34 and the cap 28 between the water jackets 24 and the radiator 30. The upper outlet 26 of the water jackets 24 is connected to the upper inlet 31 of the radiator 30 by the passage 29. The lower outlet 32 of the radiator 30 is connected to the inlet 33 of the water pump 25 through the passage 34, the cap 28 and the thermostat housing 27. The bypass passage 36 is disposed to communicate the thermostat housing 27 with the passage 29 at the junction 35. Thus, the thermostat housing 27 has a first passage forming a part of a main passage between the outlet 32 of the radiator 30 and the inlet 33 of the water pump 25 and a second passage forming a part of the bypass passage 36.

In operation, during engine warmup, since the primary valve 5 of the thermostat 1 closes as shown in FIG. 5, the coolant drawn from the water jackets 24 through the water pump 25 circulates passing through the bypass passage 36 and the thermostat housing 27, as indicated by arrows.

In the thermostat closed state, the pressure of the coolant flowing in the bypass passage 36 and the housing 27 is exerted on the primary valve 5 to increase the pressure against the valve seat 2. On the other hand, the pressure of the coolant in the cap 28 is exerted on the groove 20a in the seal packing 20 of the sub-sealing mechanism, so that the movable lip portion 21 of the seal packing 20 is deflected to the inside wall 22 of the frame 3, thereby tightly abutting the outer periphery of the lip portion 21 on the inside wall 22. Thus, the low temperature coolant in the cap 28 is prevented from entering the housing 27.

From the foregoing, it will be understood that the present invention provides a thermostat in which the resilient seal means has the main sealing mechanism and the sub-sealing mechanism completely prevents the leakage of the coolant from the primary valve in dependence on the cooperation of both the sealing mechanisms. Thus, the thermostat with a high sealing effect is provided. Although, the seal packing of the seal member has a V-shaped cross section, the seal member having another section such as U-shaped section.

While the invention has been described in conjunction with preferred specific embodiment thereof, it will be understood that this description is intended to illustrate and not limit the scope of the invention, which is defined by the following claims.

What is claimed is:

1. A wax-pellet thermostat for an engine cooling system having a water jacket and a radiator, the thermostat comprising: a thermostat housing having a first passage forming a part of a main passage from an outlet of the radiator to an inlet of the water jacket and a second passage forming a part of a bypass passage from an outlet of the water jacket to the inlet of the water jacket, a thermostat frame provided in the thermostat housing and secured to an inner wall of the thermostat housing, a valve seat formed on an inside wall of the thermostat frame facing to an inside of the thermostat housing, a rod secured to the frame, a guide member slidably mounted around said rod, a primary valve disposed in the thermostat housing and secured to said guide member, the primary valve having a resilient annular seal member provided on a periphery of the primary valve, said resilient annular seal member having a flange portion with a valve face against the flow of the coolant in said first passage and having an annular groove against said valve face to form an annular resilient lip, a coil spring for biasing said primary valve so as to press said valve face against said valve seat to close the first passage, a heat conductive cylinder secured to said guide member, a secondary valve provided on the heat conductive cylinder so as to close the second passage, an outer periphery of the resilient lip being arranged to be pressed against an inside wall of the frame by the pressure of the coolant in the first passage applied to the lip of the annular groove, whereby the primary valve acts as a double closing valve device with the valve face and the lip.

2. The wax-pellet thermostat according to claim 1 wherein diameter of said flange portion is larger than diameter of a periphery of said resilient lip.

* * * * *